(12) United States Patent
Shibata

(10) Patent No.: US 6,261,172 B1
(45) Date of Patent: Jul. 17, 2001

(54) VEHICLE AIR CONDITIONER WITH ROTARY DOOR

(75) Inventor: Kazuji Shibata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/479,834

(22) Filed: Jan. 7, 2000

(30) Foreign Application Priority Data

Jan. 28, 1999 (JP) .................................................... 11-19778

(51) Int. Cl.⁷ ........................................................ B60H 1/26
(52) U.S. Cl. ............................................ 454/121; 454/124
(58) Field of Search ...................................... 454/121, 124

(56) References Cited

U.S. PATENT DOCUMENTS

| | | | |
|---|---|---|---|
| 5,350,335 | * 9/1994 | Andersson | 454/121 |
| 5,366,408 | * 11/1994 | Andersson | 454/121 |
| 5,399,120 | 3/1995 | Burns et al. | 454/121 X |
| 5,564,979 | 10/1996 | Sumiya et al. | |

FOREIGN PATENT DOCUMENTS

| | | | |
|---|---|---|---|
| 3421323 | * 12/1985 | (DE) | 454/121 |
| 0691228 A1 | 7/1995 | (EP) | |
| 0709241 A1 | 10/1995 | (EP) | |
| A-10-29419 | 2/1998 | (JP) | |

* cited by examiner

Primary Examiner—Harold Joyce
(74) Attorney, Agent, or Firm—Harness, Dickey & Pierce, PLC

(57) ABSTRACT

In a vehicle air conditioner with a rotary door, an air vent is opened in side end plates of the rotary door in an axial direction, and a communication port communicating with the air vent is opened in a side surface of a heater case opposite to the side plates of the rotary door. Further, a side face air passage communicating with the communication port of the heater case and a side face air outlet of a passenger compartment is provided outside the heater case. Thus, a part of conditioned air flows into a main air passage in the heater case through an opening of the rotary door, while a part of conditioned air flows into the side face air passage through the air vent of the rotary door and the communication port of the heater case. As a result, in the vehicle air conditioner, it is possible to always open the side face air outlet in each air outlet mode, without reducing an air amount blown into the passenger compartment.

15 Claims, 5 Drawing Sheets

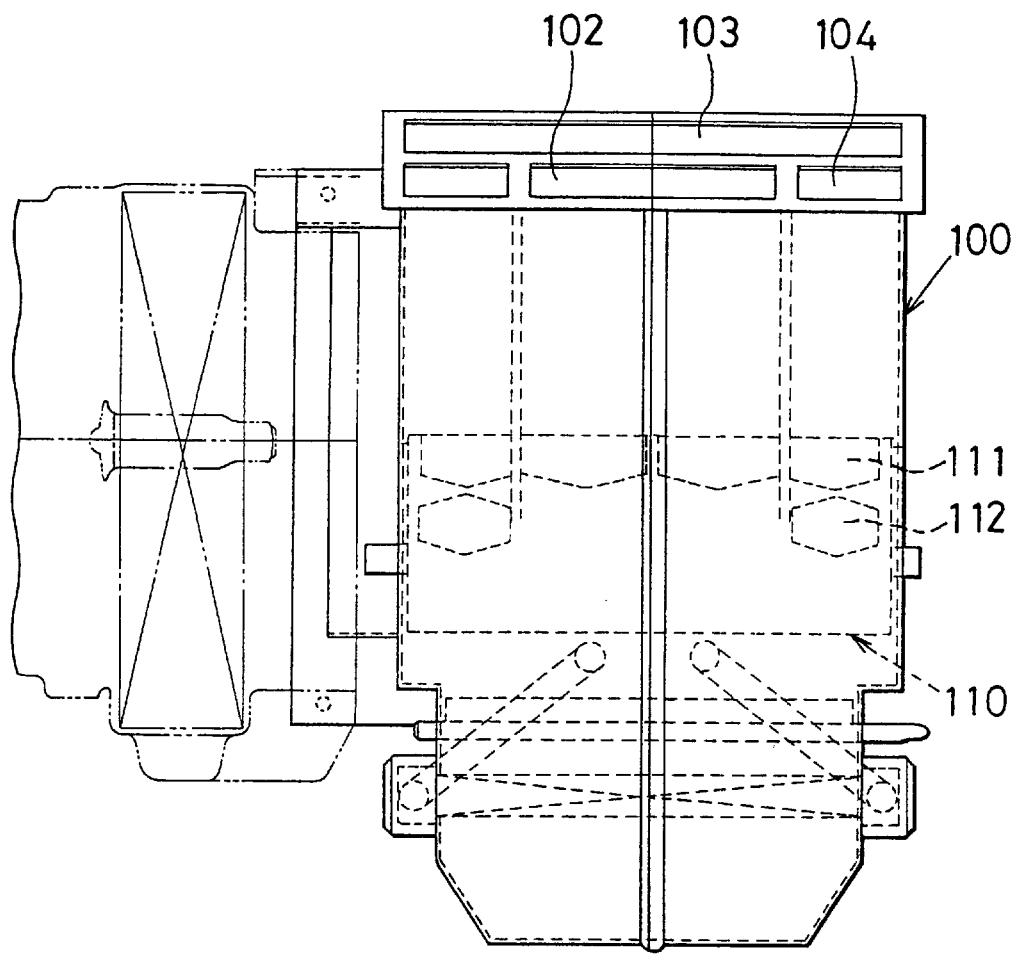

VEHICLE AIR CONDITIONER WITH ROTARY DOOR

CROSS-REFERENCE TO RELATED APPLICATION

This application is related to and claims priority from Japanese Patent Application No. Hei. 11-19778 filed on Jan. 28, 1999, the contents of which are hereby incorporated by reference.

BACKGROUND OF THE INVENTION

1. Field of the Invention

The present invention relates to a vehicle air conditioner having a rotary door for switching an air outlet mode.

2. Description of Related Art

In a conventional vehicle air conditioner described in U.S. Pat. No. 5,564,979, as shown in FIG. 4, a heater case 100 has therein a foot air passage 101, a face air passage 102 and a defroster air passage 103 which respectively communicate with a foot air outlet, a face air outlet and a defroster air outlet opened into a passenger compartment. Further, a rotary door 110 for switching the three air passages 101, 102, 103 is disposed in the heater case 100, and openings 111 are provided in a circular arc-shaped outer peripheral surface. Therefore, by moving the openings 111 in a circumferential direction with a rotation of the rotary door 110, the three air passages 101, 102, 103 are selectively opened and closed. However, in the convention air conditioner, when a foot mode, a foot/defroster mode or a defroster mode is selected, it is impossible to open a side face air outlet.

In recent years, for improving defrosting performance of a side windshield, it is desired to always open a side face air outlet so that air is always blown from the side face air outlet. For always opening the side face air outlet in the conventional air conditioner having the rotary door 110, both side face air passages 104 communicating with the side face air outlet may be provided at both sides of the face air passage 102 so that air is supplied to the side face air passages 104 even in an air outlet mode except for a face mode, as shown in FIG. 5. Specifically, side face openings 112 always communicating with the side face air passages 104 in any one air outlet mode may be provided on the outer circumferential surface of the rotary door 110 at both sides in an axial direction to correspond to the side face air passages 104.

However, when the side face openings 112 are provided in the outer circumferential surface of the rotary door 110, a part of the side face openings 112 of the rotary door 110 communicates with the defroster air passage 103 and the foot air passage 101 during a face mode. Therefore, during the face mode, air is leaked from the defroster air outlet and the foot air outlet. For preventing the air-leaking, a part of the defroster air passage 103 and a part of the foot air passage 101 may be closed. However, in this case, the defroster air passage 103 and the foot air passage 101 become narrower, and an air amount blown from each of the defroster air outlet and the foot air outlet becomes smaller.

SUMMARY OF THE INVENTION

In view of the foregoing problems, it is an object of the present invention to provide a vehicle air conditioner having a rotary door for switching an air outlet mode, in which air is always blown from a side face air outlet without decreasing an air amount from each air outlet.

According to the present invention, in a vehicle air conditioner, a first port is provided in a side surface of a rotary door in an axial direction while an opening portion for opening plural air passages is provided in an outer peripheral surface of the rotary door in a circumferential direction, a second port communication with the first port is provided in a case for defining plural air passages at a position opposite to the side surface of the rotary door, and a side face air passage through which the second port communicates with a side face air outlet is provided. Therefore, regardless of a selected air outlet mode, that is, regardless of a rotation position of the rotary door, air is always supplied to the side face air outlet from the first port opened in the side surface of the rotary door through the second port and the side face air passage. In this case, because the first port is provided in the side surface of the rotary door, it is not necessary to close a part of the other air passages for preventing air-leak, and an air amount blown into a passenger compartment is not reduced in each air outlet mode.

Preferably, any one of the first port in the side surface of the rotary door and the second port of the case is formed into an elongated shape bent along a rotation direction of the rotary door. Therefore, even when the rotary door is rotated in accordance with a selected air outlet mode, the first port and the second port are readily set to communicate with each other within an opening range of the elongated shape.

More preferably, the first port and the second port communicate with each other to have a communication opening area therebetween, and the communication opening area is changed in accordance with a rotation position of the rotary door. Therefore, it is possible to change the air amount blown toward a side windshield from the side face air outlet in accordance with the rotation position of the rotary door corresponding to a selected air outlet mode.

BRIEF DESCRIPTION OF THE DRAWINGS

Additional objects and advantages of the present invention will be more readily apparent from the following detailed description of preferred embodiments when taken together with the accompanying drawings, in which:

FIG. 5 is schematic view showing a ventilation system of a vehicle air conditioner.

DETAILED DESCRIPTION OF THE PRESENTLY PREFERRED EMBODIMENT

Figure 1:
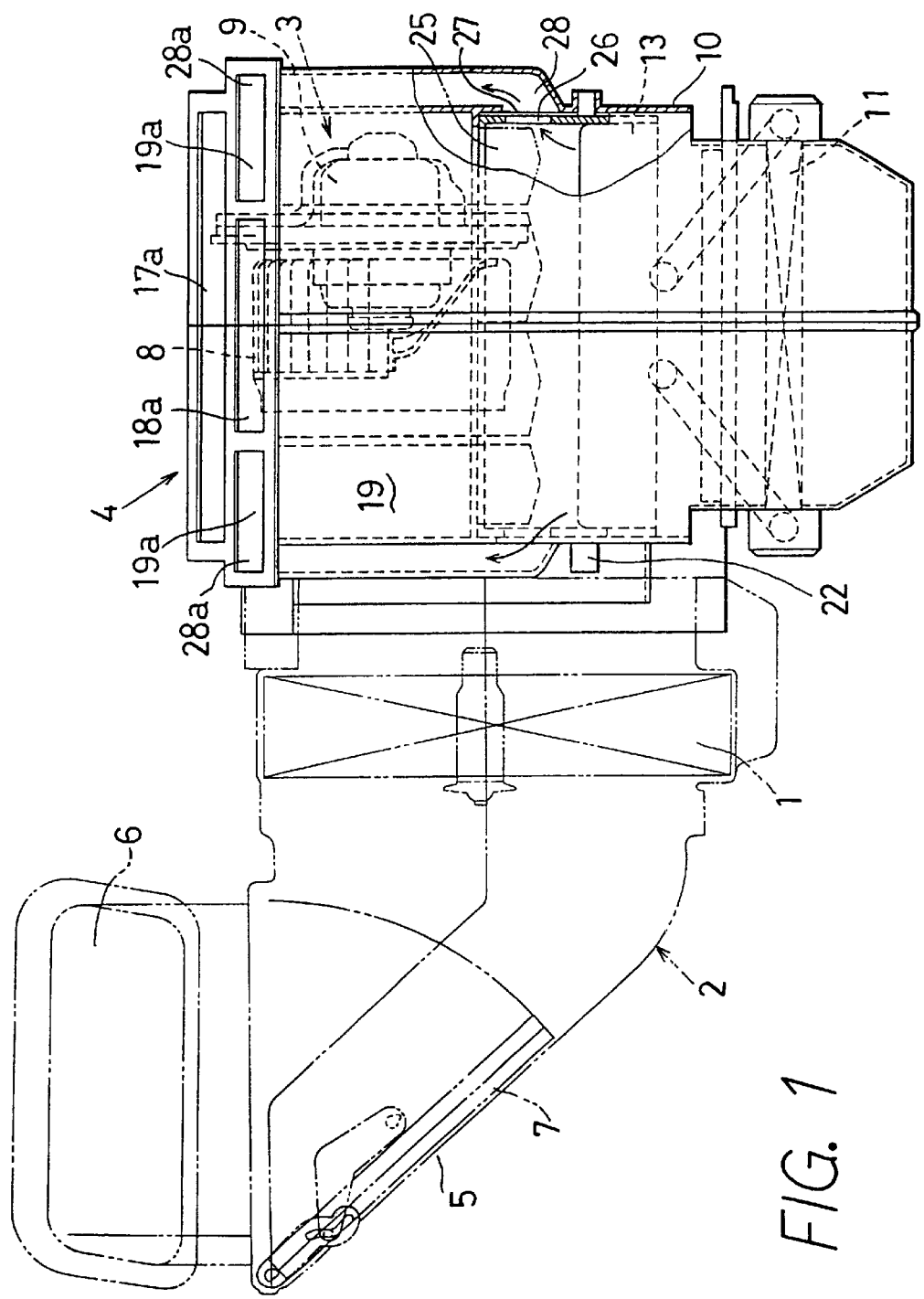
FIG. 1 is a schematic view showing a ventilation system of a vehicle air conditioner according to a first preferred embodiment of the present invention.

A first preferred embodiment of the present invention will be described hereinafter with reference to FIGS. 1 and 2. In the first embodiment, an air conditioner of the present invention is mounted in a light vehicle, for example. As shown in FIG. 1, a blower 3 is disposed at a downstream air side of a cooler unit 2 having an evaporator 1, and the blower 3 is integrally assembled into a heater unit 4. The cooler unit 2 includes an inside air introduction port 5 for introducing inside air inside a passenger compartment, an outside air introduction port 6 for introducing outside air outside the passenger compartment, and an inside/outside air switching door 7 for selectively opening and closing the inside air introduction port 5 and the outside air introduction port 6.

The blower 3 includes a centrifugal fan 8 and a fan motor 9 for drawing and rotating the centrifugal fan 8. By the rotation of the centrifugal fan 8, an air flow toward the passenger compartment is generated. The heater unit 4 includes a heater case 10, a heater core 11 disposed in the heater case 10, an air mixing door (A/M door) 12 and a rotary door 13.

The heater case 10 is an air-leading duct for leading air toward air outlets opened at predetermined positions within the passenger compartment. Specifically, as shown in FIG. 2, the heater case 10 has therein a scroll-like air discharge passage 14 formed around the centrifugal fan 8, a warm air passage 15 in which air from the air discharge passage 14 passes through the heater core 11, a bypass passage 16 through which air from the air discharge passage 14 bypasses the warm air passage 15, and plural air passages (described later) communicating with the air outlets. The air outlets includes a defroster air outlet from which air is blown toward a front windshield, a center face air outlet from which air is blown toward an upper side of the passenger compartment, a side face air outlet from which air is blown toward a side windshield, and a foot air outlet from which air is blown toward a lower side of the passenger compartment.

Figure 2:
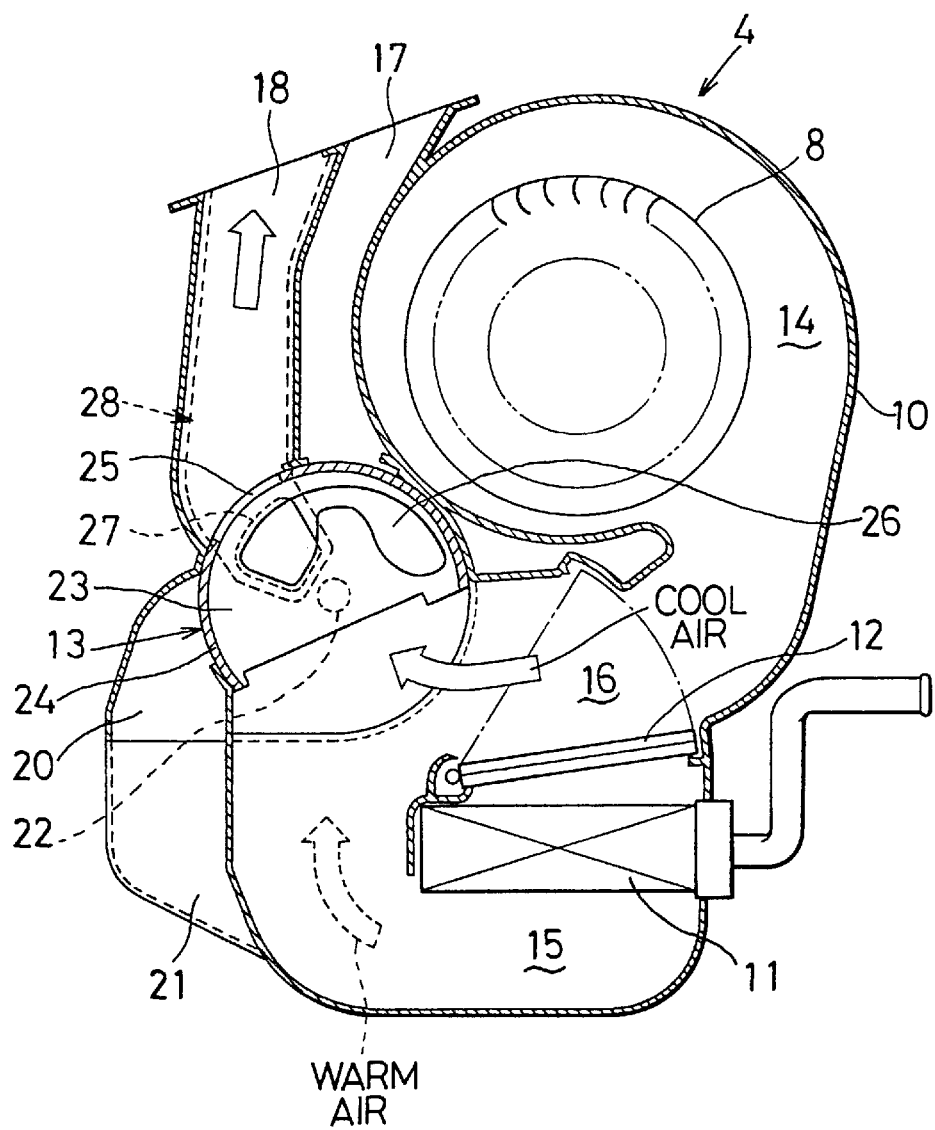
FIG. 2 is a schematic sectional view showing an inner structure of a heater unit of the vehicle air conditioner according to the first embodiment.

As shown in FIG. 2, the plural air passages include a defroster air passage 17 communicating with the defroster air outlet, a center face air passage 18 communicating with the center face air outlet, a first side face air passage 19 (see FIG. 1) communicating with the side face air outlet, and a foot air passage 20 communicating with the foot air outlet. Upstream side openings of the air passages 17, 18, 20 are provided along an outer peripheral surface of the rotary door 13 to be arranged in a circumferential direction of the rotary door 13. Further, the first side face air passage 19 is provided in the heater case 10 at both sides of the center face air passage 18 in an axial direction (i.e., right-left direction in FIG. 1) of the rotary door 13. The defroster air passage 17 has a downstream end opening 17a connected to a duct, the center face air passage 18 has a downstream end opening 18a connected to a duct, and the first side face air passage 19 has a downstream end opening 19a connected to a duct. The defroster air passage 17, the center face air passage 18 and the first side face air passage 19 respectively communicate with the defroster air outlet, the center face air outlet and the side face air outlet, respectively through the ducts connected to the downstream end openings 17a, 18a, 19a. On the other hand, a downstream end opening of the foot air passage 20 is directly opened into the passenger compartment to be used as a foot air outlet 21, as shown in FIG. 2.

The heater core 11 heats air passing therethrough using engine-cooling water (hot water) as a heating source. The heater core 11 is disposed in the warm air passage 15 within the heater case 10.

The air mixing door 12 adjusts an air amount flowing through the warm air passage 15 and an air amount flowing through the bypass passage 16 within the heater case 10. The air mixing door 12 is disposed to be rotatable between a first position (i.e., the position shown in FIG. 2) where the warm air passage 15 is fully closed at an upstream side of the heater core 11 and a second position where the bypass passage 16 is fully closed.

As shown in FIG. 2, the rotary door 13 includes a rotation shaft 22, two end plates 23 held in both ends of the rotation shaft 22, and an outer peripheral plate 24 disposed along the outer peripheral shapes of the two end plates 23 to extend between the two end plates 23. Each of the end plates 23 is formed into an approximate semi-circular shape. Plural openings 25 are opened in the outer peripheral plate 24 along the axial direction, as shown in FIG. 1. The outer peripheral surface of the rotary door 13 may be placed on a rod-like frame member between both the end plates 23, so that a film member may be placed on the frame member.

Both ends of the rotation shaft 22 of the rotary door 13 are rotatably held in both side surfaces of the heater case 10. By an operation of an air outlet mode switching lever provided on an air-conditioning (A/C) operation panel, the rotation shaft 22 of the rotary door 13 is rotated clockwise or counterclockwise through a control cable so that an air outlet mode is switched.

By the above-described structure of the first embodiment, the rotary door 13 can selects an air outlet mode such as a face mode where both the center face air passage 18 and the first side face air passage 19 are opened, a bi-level mode where a part of the center face air passage 18, a part of the first side face air passage 19 and a part of the foot air passage 20 are opened, a foot mode where the foot air passage 20 is opened, a defroster mode where the defroster air passage 17 is opened, or a foot/defroster mode where a part of the foot air passage 20 and a part of the defroster air passage 17 are opened.

In the first embodiment of the present invention, the two end plates 23 and the outer peripheral plate 24 define approximately semi-cylindrical inner space of the rotary door 13. A part of air supplied into the inner space of the rotary door 13 flows from an air vent 26 provided in the two end plates 23. The air vent 26 is opened in an elongated shape bent along the rotation direction of the rotary door 13, while the opening width of the air vent 26 in a radial direction is arbitrarily changed.

On the other hand, a communication port 27 communication with the air vent 26 is provided in a side surface of the heater case 10 opposite to the end plates 23 of the rotary door 13, and a second side face air passage 28 communicating with the communication port 27 and the side face air outlet is provided outside the heater case 10. The second side face air passage 28 is provided so that a downstream end opening 28a of the second side face air passage 28 is joined together with the downstream end opening 19a of the first side face air passage 19 formed within the heater case 10.

Next, operation of the vehicle air conditioner will be now described. Air introduced from the inside air introduction port 5 or the outside air introduction port 6 is introduced into the heater case 10 after passing through the evaporator 1 by the rotation of the centrifugal fan 8. When a refrigerant cycle operates, air passing through the evaporator 1 is cooled by performing heat exchange with low-temperature refrigerant flowing in the evaporator 1.

Air introduced into the heater case 10 passes through the air discharge passage 14, and temperature of air is adjusted in accordance with an opening degree of the air mixing door 12. When a maximum cooling is set, because the air mixing door 12 fully closes the warm air passage 15, all air from the air discharge passage 14 flows through the bypass passage 16 without being heated in the heater core 11. On the other hand, when a maximum heating is set, because the air mixing door 12 fully closes the bypass passage 16, all air from the air discharge passage 14 flows into the warm air passage 11 to be heated in the heater core 11.

Conditioned air having being temperature-adjusted flows into an air passage through the opening 25 of the rotary door 13, and is blown into the passenger compartment from an air outlet communicating with the air passage. Further, a part of conditioned air flows from the air vent 26 opened in the end plates 23 of the rotary door 13, and is blown from the side face air outlet after flowing through the second side face air passage 28 from the communication port 27 opened in the side surface of the heater case 10.

According to the first embodiment of the present invention, regardless of the rotation position of the rotary door 13, a part of conditioned air is introduced from the air vent 26 opened in the end plates 23 of the rotary door 13 into the second side face air passage 28 through the communication port 27, and is supplied into the side face air outlet. That is, regardless of a selected air outlet mode, the side face air outlet is always opened so that air is always blown from the side face air outlet.

During the face mode, the opening 25 of the rotary door 13 is overlapped with the center face air passage 18 and the first side face air passage 19, and the other air passages (i.e., the defroster air passage 17 and the foot air passage 20) are closed by the outer peripheral plate 24 of the rotary door 13. Thus, even when the vehicle air conditioner is constructed so that air is always blown from the side face air outlet, it is not necessary to close a part of the defroster air passage 17 and the foot air passage 20 while air leak is prevented. Therefore, in an air outlet mode where the defroster air passage 17 or the foot air passage 20 is opened, the air amount blown into the passenger compartment is prevented from being decreased.

Further, the air vent 26 is opened in the end plates 23 of the rotary door 13 in the elongated shape bent along the rotation direction of the rotary door 13, and the opening width in the radial direction of the rotary door 13 is arbitrarily changed on the circumferential direction. In this case, an opening area where the air vent 26 of the rotary door 13 and the communication port 27 opened in the side surface of the heater case 10 communicate with each other is changed by the rotation position of the rotary door 13. Thus, it is possible for the opening area for communicating the air vent 26 and the communication port 27 to be changed in accordance with a selected air outlet mode. As a result, the air amount blown from the side face air outlet is set to be changed in accordance with an air outlet mode. Accordingly, in each air outlet mode, the air amount blown from the side face air outlet is arbitrarily changed.

Further, the position of the air vent 26 can be set based on a temperature distribution of air flowing into the rotary door 13. In this case, the temperature of air blown from the side face air outlet can be arbitrarily set to be higher than, to be equal to or to be lower than temperature of air blown from a main air outlet (e.g., the defroster air outlet, the center face air outlet, or the foot air outlet).

In the above-described first embodiment of the present invention, for restricting air from being leaked between the air vent 26 of the rotary door 13 and the communication port 27 of the heater case 10, a clearance between the end plates 23 of the rotary door 13 and the side surface of the heater case 10 is set as small as possible, in a degree without restricting the operation of the rotary door 13.

In the above described first embodiment, the air vent 26 of the rotary door 13 is opened in the elongated shape to be bent in the rotation direction of the rotary door 13. However, the shape of the air vent 26 and the shape of the communication port 27 may be set to be converse. That is, the shape of the air vent 26 may be a simple round hole or an angular hole, and the communication port 27 of the heater case 10 may be formed into an elongated shape to be bent along the rotation direction of the rotary door 13.

Further, in the above-described first embodiment, the second side face air passage 28 may be formed integrally with the heater case 10, or may be formed separately from the heat case 10 to be provided outside the heater case 10. Further, the second side face air passage 28 may be formed within the heater core 10 by the heater case 10.

Figure 3:
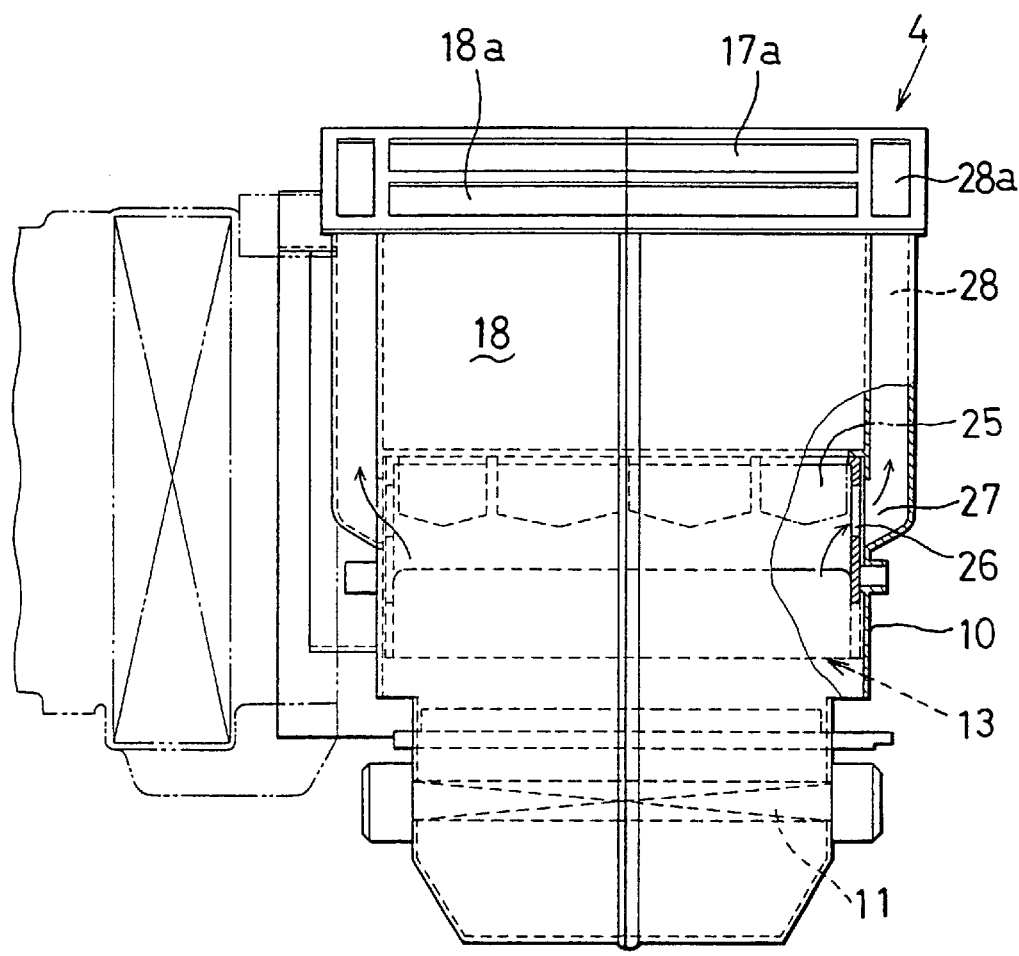
FIG. 3 is a schematic view showing a ventilation system of a vehicle air conditioner according to a second preferred embodiment of the present invention.
Figure 4:
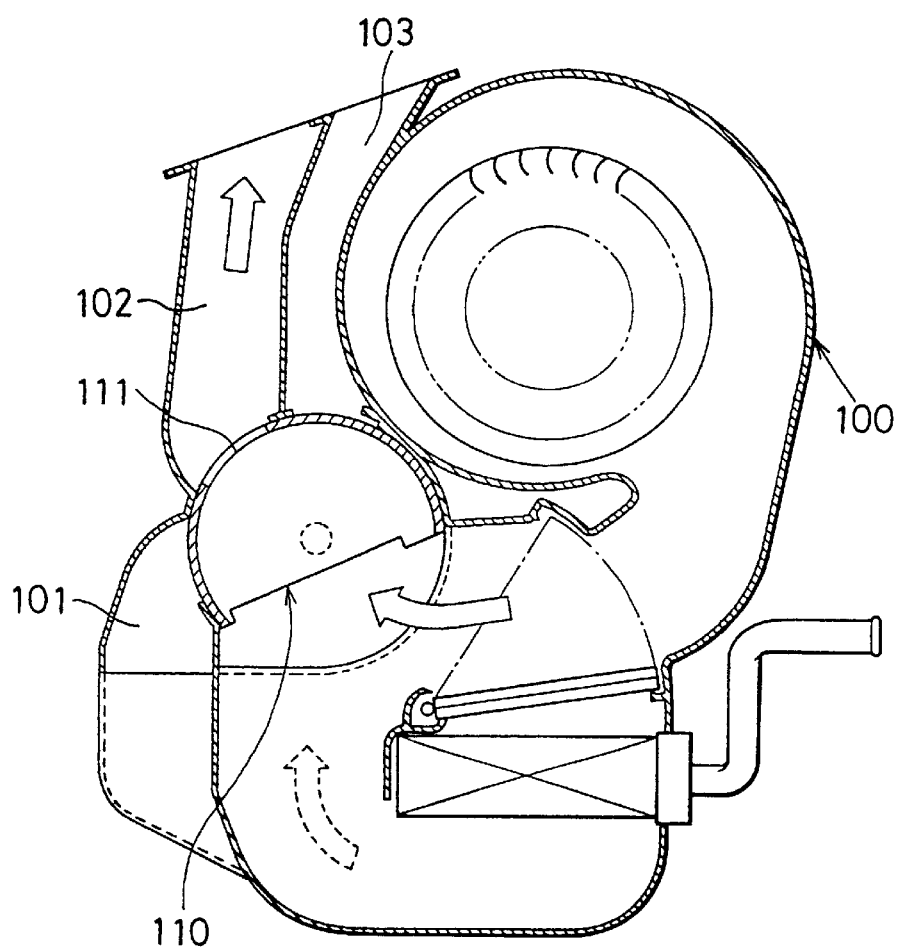
FIG. 4 is a schematic sectional view showing an inner structure of a conventional heater unit.

A second preferred embodiment of the present invention will be now described with reference to FIG. 3. In the second embodiment, the first side face air passage 19 described in the first embodiment is not provided in the heater unit 4, and the center face air passage 18 is formed along the entire length of the rotary door 13 in the axial direction (i.e., right-left direction in FIG. 3). Therefore, in this case, only the second side face air passage 28 communicates with the side face air outlet through the downstream side opening 28a. In the second embodiment, the other portions are similar to those in the above-described first embodiment. Thus, the effect similar to that of the first embodiment can be obtained.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioner for a vehicle passenger compartment having a side face air outlet from which air is blown toward a side windshield and air outlets from which air is blown toward different directions except for the side windshield, said air conditioner comprising:

a case for defining plural air passages for leading air toward the air outlets;

means for defining a side face air passage communicating with the side face air outlet; and a rotary door disposed in said case at an upstream side of said plural air passages, said rotary door including a side surface in an axial direction, and an outer peripheral surface in a circumferential direction, wherein:

said outer peripheral surface of said rotary door has an opening portion for opening said plural air passages;

said rotary door is rotatable to selectively open and close said plural air passages to set plural air outlet modes;

said side surface of said rotary door has a first port for flowing air;

said case has a second port communicating with said first port and said side face air passage, at a position opposite to said side surface of said rotary door;

any one of said first port in said side surface of said rotary door and said second port of said case is formed into an elongated shape elongated along a rotation direction of said rotary door to have a predetermined dimension in the rotation direction; and said predetermined dimension having a sufficient length such that during at least two air outlet modes among said plural air outlet modes, said first port and said second port are positioned opposite to each other to communicate with each other.

2. The air conditioner according to claim 1, wherein any one of said first port in said side surface of said rotary door and said second port of said case is formed into an elongated shape bent along a rotation direction of said rotary door.

3. The air conditioner according to claim 1, wherein:

said first port and said second port communicate with each other to have a communication opening area therebetween; and said communication opening area is changed in accordance with a rotation position of said rotary door.

4. The air conditioner according to claim 3, wherein:

said rotary door is rotatable to correspond to a selected air outlet mode where air is blown toward a predetermined direction in the passenger compartment; and said communication opening area is set in accordance with the selected air outlet mode.

5. The air conditioner according to claim 1, wherein the air outlets include a center face air outlet from which air is blown toward an upper side of the passenger compartment, a defroster air outlet from which air is blown toward a front windshield, and a foot air outlet from which air is blown toward a lower side of the passenger compartment.

6. The air conditioner according to claim 1, wherein said side face air passage is provided outside said case.

7. The air conditioner according to claim 1, wherein said side face air passage is provided within said case.

8. The air conditioner according to claim 1, wherein said side face air passage is defined by said case.

9. The air conditioner according to claim 1, further comprising a heater exchanger disposed in said case, for adjusting temperature of air flowing into said rotary door.

10. The air conditioner according to claim 1, wherein said second port is provided in said case at a position proximate to said side surface of said rotary door.

11. The air conditioner according to claim 1, wherein said first port is a single opening continuously elongated in the rotation direction to have a predetermined dimension in the rotation direction.

12. The air conditioner according to claim 1, wherein said at least two air outlet modes among said plural air outlet modes includes a foot mode and a defrosting mode.

13. An air conditioner for a vehicle having a passenger compartment, said air conditioner comprising:

a case for defining plural air passages having downstream end openings which include a side face opening through which air is blown toward a side windshield, and openings through which air is blown toward different directions in the passenger compartment except for the side windshield;

a rotary door disposed in said case at an upstream side of said plural air passages, said rotary door including a side surface in an axial direction, and a circular arc-shaped outer peripheral surface in a circumferential direction; and means for defining a side face air passage communicating with said side face opening, wherein:

said outer peripheral surface of said rotary door has an opening portion for opening said plural air passages;

said side surface of said rotary door has a first port for flowing air;

said rotary door is rotatable to selectively open and close said plural air passages to set plural air outlet modes;

said case has a second port communicating with said first port and said side face air passage, at a position opposite to said side surface of said rotary door;

any one of said first port in said side surface of said rotary door and said second port of said case is elongated along a rotation direction of said rotary door to have a predetermined dimension in the rotation direction; and said predetermined dimension having a sufficient length such that during at least two air outlet modes among said plural air outlet modes, said first port and said second port are positioned opposite to each other to communicate with each other.

14. The air conditioner according to claim 1, wherein, during all said plural air outlet modes, said first port and said second port are positioned opposite to each other to communicate with each other.

15. The air conditioner according to claim 14, wherein said plural air outlet modes are a face mode for blowing air toward an upper side of the passenger compartment, a bi-level mode for blowing air toward both upper and lower sides of the passenger compartment, a foot mode for blowing air mainly toward a lower side of the passenger compartment, a foot/defroster mode for blowing air toward both a lower side of the passenger compartment and an inner surface of a vehicle windshield, and a defroster mode for blowing air toward the inner surface of the windshield.

* * * * *